(12) United States Patent
Costea et al.

(10) Patent No.: US 7,721,334 B2
(45) Date of Patent: May 18, 2010

(54) DETECTION OF CODE-FREE FILES

(75) Inventors: Mihai Costea, Redmond, WA (US);
Michael Sheldon, Seattle, WA (US);
Zeke Odins-Lucas, Seattle, WA (US);
Marc Seinfeld, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 1030 days.

(21) Appl. No.: 10/769,106

(22) Filed: Jan. 30, 2004

(65) Prior Publication Data
US 2005/0172339 A1     Aug. 4, 2005

(51) Int. Cl.
G06F 17/30     (2006.01)
(52) U.S. Cl. .......................................... 726/24
(58) Field of Classification Search .................. 726/24
See application file for complete search history.

(56) References Cited

U.S. PATENT DOCUMENTS

| | | | |
|---|---|---|---|
| 5,754,761 A | 5/1998 | Willsey | |
| 5,948,104 A | 9/1999 | Gluck et al. | |
| 5,960,170 A * | 9/1999 | Chen et al. | 714/38 |
| 6,006,329 A | 12/1999 | Chi | |
| 6,021,510 A | 2/2000 | Nachenberg | |
| 6,067,410 A | 5/2000 | Nachenberg | |
| 6,230,288 B1 | 5/2001 | Kuo et al. | |
| 6,401,210 B1 | 6/2002 | Templeton | |
| 7,496,963 B2 * | 2/2009 | Shipp | 726/24 |
| 2001/0020272 A1 | 9/2001 | Le Pennec | |
| 2001/0047481 A1 | 11/2001 | Inoha et al. | |
| 2002/0013910 A1 * | 1/2002 | Edery et al. | 713/201 |
| 2002/0078216 A1 | 6/2002 | Pankovcin et al. | |
| 2002/0083334 A1 | 6/2002 | Rogers | |
| 2002/0095598 A1 | 7/2002 | Camble | |
| 2002/0116628 A1 | 8/2002 | Vignoles | |
| 2002/0144140 A1 | 10/2002 | Ellison et al. | |
| 2003/0023866 A1 | 1/2003 | Hinchliffe | |
| 2003/0041259 A1 | 2/2003 | Vignoles | |
| 2003/0074573 A1 | 4/2003 | Hursey | |

(Continued)

FOREIGN PATENT DOCUMENTS

KR     20030096167 A     12/2003

(Continued)

OTHER PUBLICATIONS

Sun Microsystems: "Man pages section1: User Commands" Internet Disclosure, 'Online. Dec. 2003, pp. 1-24, 392-393, XP002329038 Retrieved from the internet: URL:http://docs-pdf.sun.com/817-0689/817-0-689.pdf>,retrieved on May 23, 2005, pp. 392-393.

(Continued)

*Primary Examiner*—Nasser Moazzami
*Assistant Examiner*—Daniel L Hoang
(74) *Attorney, Agent, or Firm*—Lee & Hayes, PLLC

(57) ABSTRACT

Detection of code-free files is described. According to one implementation, an input file is parsed to recognize a file format. Contents of the input file are checked according to the recognized file format, if available, in an effort to determine whether executable code might exist within the input file. A status is then sent in response to the checking.

18 Claims, 6 Drawing Sheets

U.S. PATENT DOCUMENTS

| | | | |
|---|---|---|---|
| 2003/0074574 A1 | 4/2003 | Hursey | |
| 2003/0079142 A1 | 4/2003 | Margalit et al. | |
| 2003/0110393 A1 | 6/2003 | Brock | |
| 2003/0115479 A1 | 6/2003 | Edwards | |
| 2003/0120950 A1 | 6/2003 | Hunt | |
| 2003/0196103 A1 | 10/2003 | Edwards | |
| 2003/0217281 A1 | 11/2003 | Ryan | |
| 2003/0217286 A1 | 11/2003 | Carmona et al. | |
| 2004/0015712 A1 | 1/2004 | Szor | |
| 2006/0136389 A1* | 6/2006 | Cover et al. ................ | 707/3 |

FOREIGN PATENT DOCUMENTS

| | | |
|---|---|---|
| RU | 2143184 C1 | 12/1999 |
| WO | WO 0188673 | 11/2001 |
| WO | WO 0205072 | 1/2002 |
| WO | WO 0213469 | 2/2002 |

OTHER PUBLICATIONS

Downs A S: "Headerdoc: Resend: Re: Bug 2479261-should support objc tags" Apple Mailing Lists-Internet Disclosure, Online. Jan. 17, 2001, xp00232941 Retrieved from the internet: URL:http://lists.apple.com/archives/headerdoc-development/2001/jan/msf00024.html> whole document.

Perkins D L : "Teach Yourself Java in 21 Days-Day 19-Streams" Internet Disclosure, Online. Mar. 5, 2001, Retrieved from the Internet: URL:http://web.archive.org/web/20010305073742/newdata.box.sk/bx/java/tyj19x.html> p. 5, lines 14/19.

Sun Microsytems "Man pages section 4: File Formats" Internet disclosure, Online, Dec. 2003, pp. 1-12,270-271,xp002329039 Retrieved from internet URL:http://docs-pdf.sun.com/817-0698/817-0698.pdf> pp. 270-271.

Gold N, Bennett K: "FACT: An assesmentframework for moder-based program comprehsion tools" Technical Report Feb. 2002-University of Durham-Internet Disclosure, Online 2002, xp00232943, URL: http://www.dur.ac.uk/compsci/research/technical-reprots/2002/tech-report_02-02.pdf> pafe 6, line.

"Control plans for the new computer viruses", Baker et al., Management Accounting, Sep. 1994, vol. 76, No. 3, pp. 47-51.

"Take steps to resolve an infectious issue", Fielder, E., Business Forms, Labels, & Systems, Jul. 1, 1999, vol. 37, No. 13, pp. 12,17.

"An analysis of some authentication methods used in anti-viral software", Radai, Y., Virus Bulletin, May 1991, pp. 11-13.

"VET anti-viral software", Jackson, K., Virus Bulletin, May 1991, pp. 18-19.

Office Action from the Patent Office of the Russian Federation for Application No. 200438761/09(042139), mailed on Jan. 26, 2009, 7 pgs.

Decision on Grant from the Patent Office of the Russian Federation for Application No. 2004138761/09(042139), mailed on Jun. 17, 2009, 7 pgs.

Lemay, et al., "Teach Yourself Java in 21 Days, Professional Reference Edition", SAMS.NET Publishing, Ch. Day 19-Streams and I/O, 1996, pp. 45.

EP Search Report For European Patent Application No. 04028765.8, mailed Mar. 3, 2008 (12 pages).

* cited by examiner

DETECTION OF CODE-FREE FILES

TECHNICAL FIELD

This disclosure relates to detection of executable code-free computer files.

BACKGROUND

Complex computer file formats—which allow for extensibility and enhanced functionality—are becoming increasingly popular. Unfortunately, they also provide a vehicle within which authors of malicious viral software may hide malevolent executable code. To combat this situation, an "arms race" exists, wherein anti-viral (AV) software makers isolate copies of each new virus and obtain a "signature" for the new virus, so that it may be subsequently recognized.

Accordingly, anti-viral (AV) software is configured to scan input files looking for signatures of each known virus. Where no known signature is found, an input file is assumed to be clear of viral infection.

Unfortunately, it is frequently the case that a new virus will pass through the AV software because the AV software has not yet been updated to include the new virus. While the AV software makers tend to respond quickly, in many cases damage is done before they are able to respond with an upgrade, and before the consumer installs the upgrade. Accordingly, a need still exists for techniques that are better able to prevent a new software virus from infecting a computer system.

SUMMARY

Detection of code-free files is described. According to one implementation, an input file is parsed to recognize a file format. Contents of the input file are checked according to the recognized file format, if available, in an effort to determine whether executable code might exist within the input file. A status is then sent in response to the checking.

BRIEF DESCRIPTION OF THE DRAWINGS

The same reference numerals are used throughout the drawings to reference like components and features.

DETAILED DESCRIPTION

Overview

The following discussion is directed to techniques for detecting code-free files. Detection of code-free files is advantageous, in that such files pose a greatly reduced security risk for users of email, instant messaging, Internet browsing and other applications. Where a file is known to be code-free, the user enjoys a higher likelihood that malicious "virus" software is not present.

General Process

Figure 1:
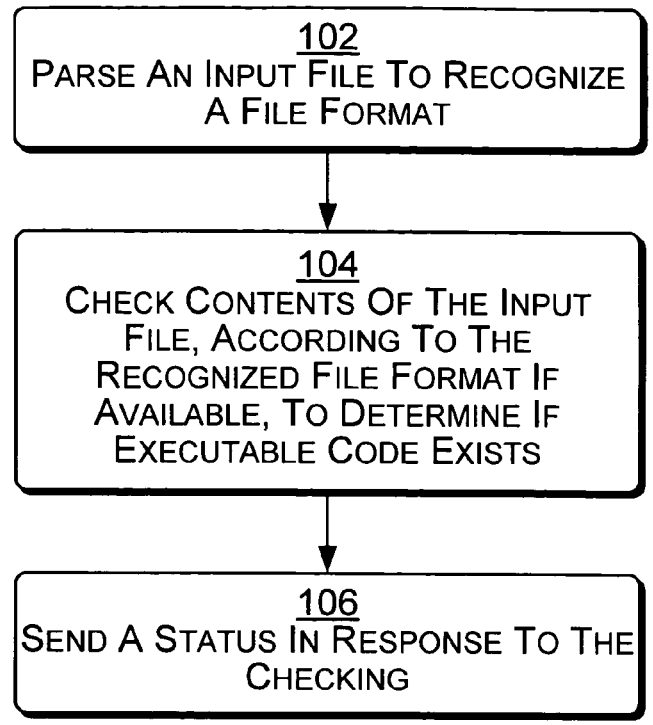
FIG. 1 is a flow diagram that describes an exemplary implementation by which code-free files may be detected, including a method employed for use in recognizing file formats and detecting executable code.

FIG. 1 shows the general process of detecting code-free files. At block 102, an input file is parsed to enable recognition of a file format by which the input file is configured. File formats are conventions by which data may be organized for use and storage; a number of such file formats are well-known, and are associated with file name extensions, wherein a limited and non-exhaustive list includes: jpeg, pdf, doc (Word®), vsd (Visio®), etc. At block 104, contents of the input file are checked according to the recognized file format, if available, to find executable code within the input file. At block 106, a status is sent according to results of the checking for executable code. Note that herein the term "code" or "executable code" is to be interpreted broadly and without limitation to examples cited, which include: processor executable instructions, scripts and other high-level languages, extensibility mechanisms and any other logic, device or mechanism which could be designed, corrupted or in any other way implemented to formulate a virus, worm or any other form of malicious, unauthorized, unwanted or unintended malware. In some implementations, the status (e.g. reflecting a file-has-code status, a file-has-no-code status or a don't-know-if-file-has-code status) may be sent to email, instant messaging, Internet browsing and other applications wherein the security from virus-infected software is advantageous.

Exemplary Environment

Figure 2:
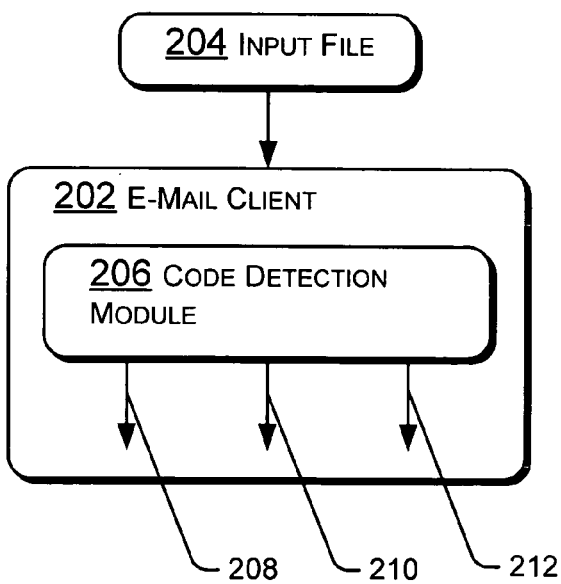
FIG. 2 illustrates an exemplary environment, wherein a code detection module is configured to provide information on executable code contained within a file to an email program.
Figure 3:
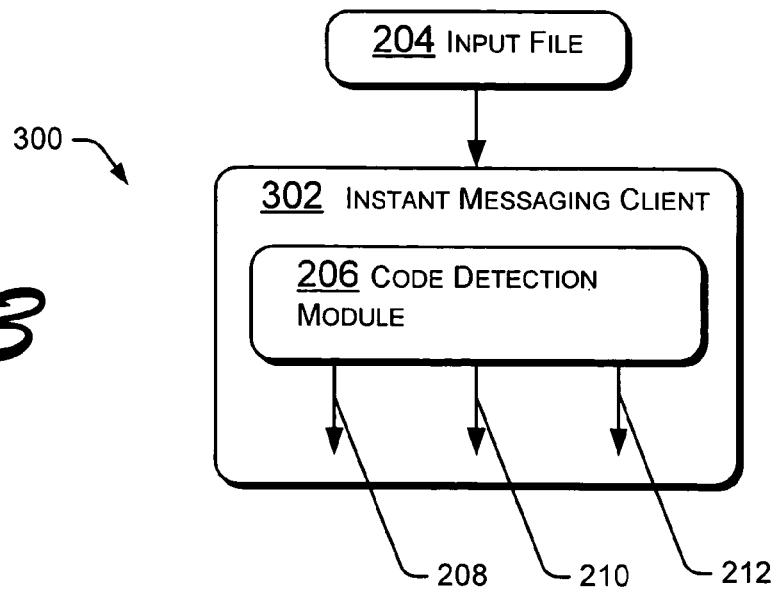
FIG. 3 illustrates a second exemplary environment, wherein a code detection module is configured to provide information on executable code contained within a file to an instant messaging program.
Figure 4:
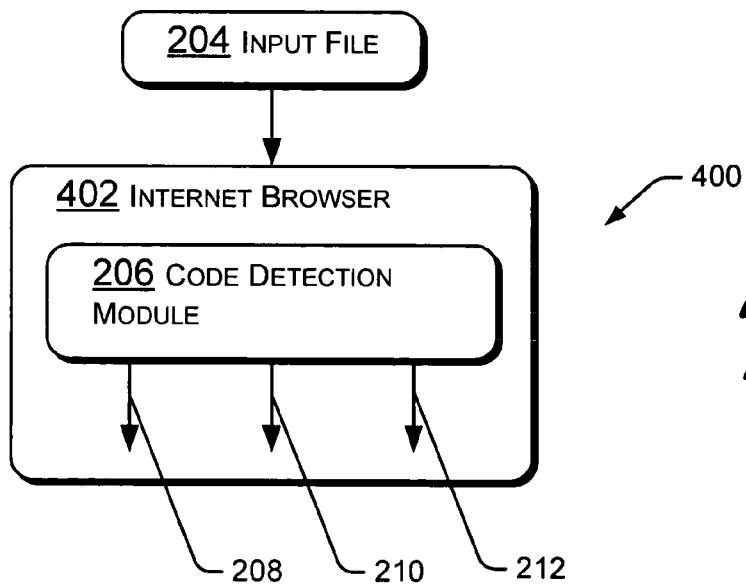
FIG. 4 illustrates a third exemplary environment, wherein a code detection module is configured to provide information on executable code contained within a file to an Internet browsing program.

FIGS. 2-4 illustrate exemplary environments 200-400 within which a system to detect code-free files may be operated. In particular, FIGS. 2-4 illustrate environments 200-400 within which an email client application 202, an instant messaging application 302 or Internet browsing program 402, respectively, are configured to receive information which may include one or more attached files 204. Note that the applications 202, 302, 402 are representative of a wide variety of hardware or software devices which could be configured to receive information from a code detection module 206. Additional representative devices include a firewall (hardware and/or software), a host intrusion detector (for use in a server, client, workstation, etc.), a host vulnerability assessor (for use in a server, client, workstation, etc.), a software backup management program, a CD and/or DVD burning program, a P2P (peer to peer) file-sharing program, or a variety of other applications. A code detection module 206 is configured to analyze the attached file 204 to determine if executable code is present. Depending upon the analysis, output of the code detection module 206 provides the application 202, 302, 402 with one of three possible inputs: a file-has-code status 208, a file-has-no-code status 210 or a don't-know (if the file has code) status 212. In the first case, the file-has-code status 208 reflects very probable recognition of a file format of the input file and discovery of executable code within the input file.

Due to the dangers inherent with having executable code within a file, the application 202, 302, 402 etc. may use knowledge of this status to perform in a manner consistent with these dangers. In the second case, the file-has-no-code status 210 reflects certain recognition of a file format of the input file and discovery of no executable code within the input file. Where the application 202, 302, 402 is assured that the file 204 is code-free, the user does not have to be troubled by dialog boxes or other aspects of a user interface requesting the user to decide if the file is to be trusted. In the third case, the don't-know (if the file has executable code) status 212 reflects failure to recognize a file format of the input file, and the resultant uncertainty of whether executable code exists within the input file.

Exemplary System

Figure 5:
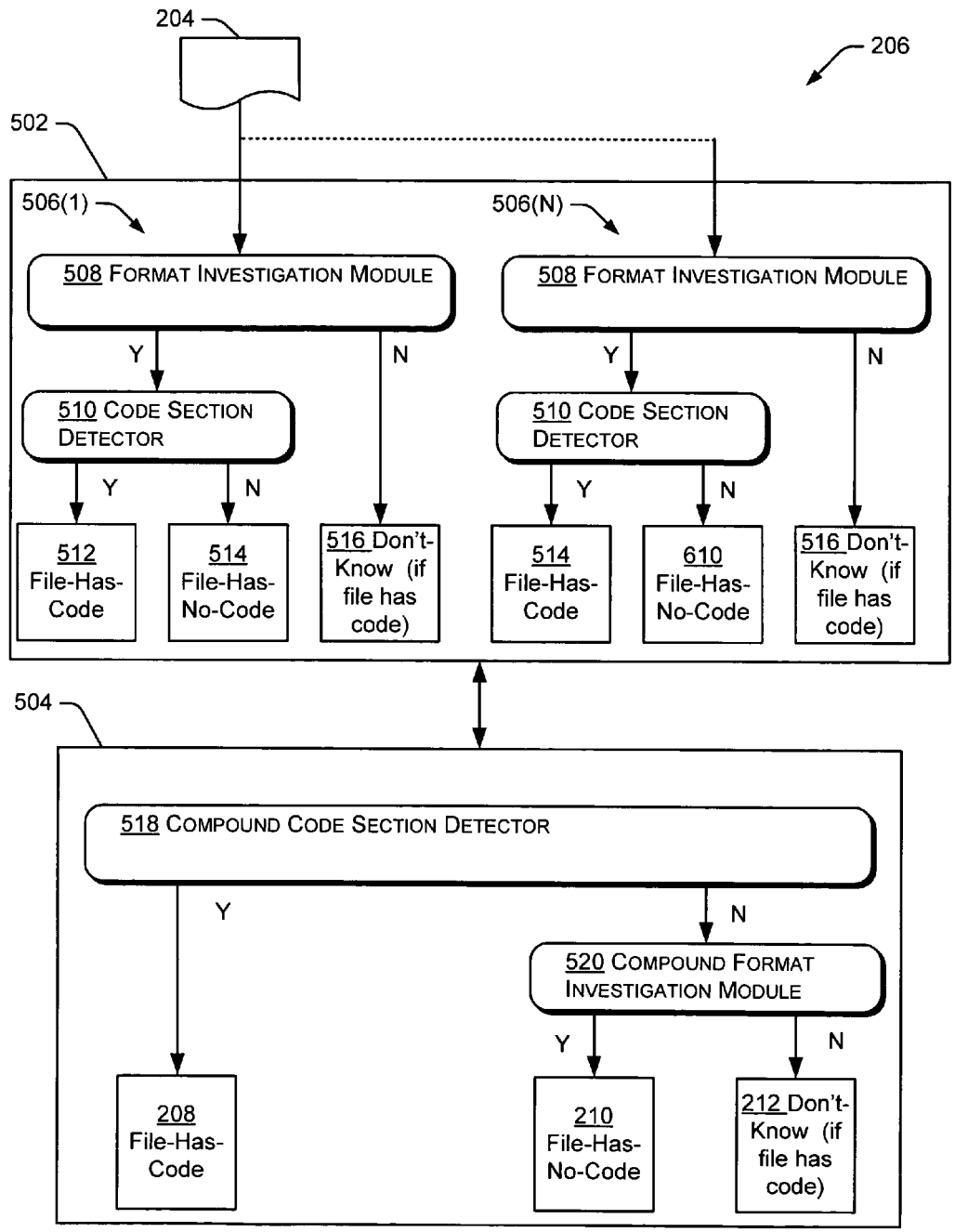
FIG. 5 illustrates exemplary detail of structure contained within the code detection module of FIGS. 2-4, including an extensible parser module.
Figure 6:
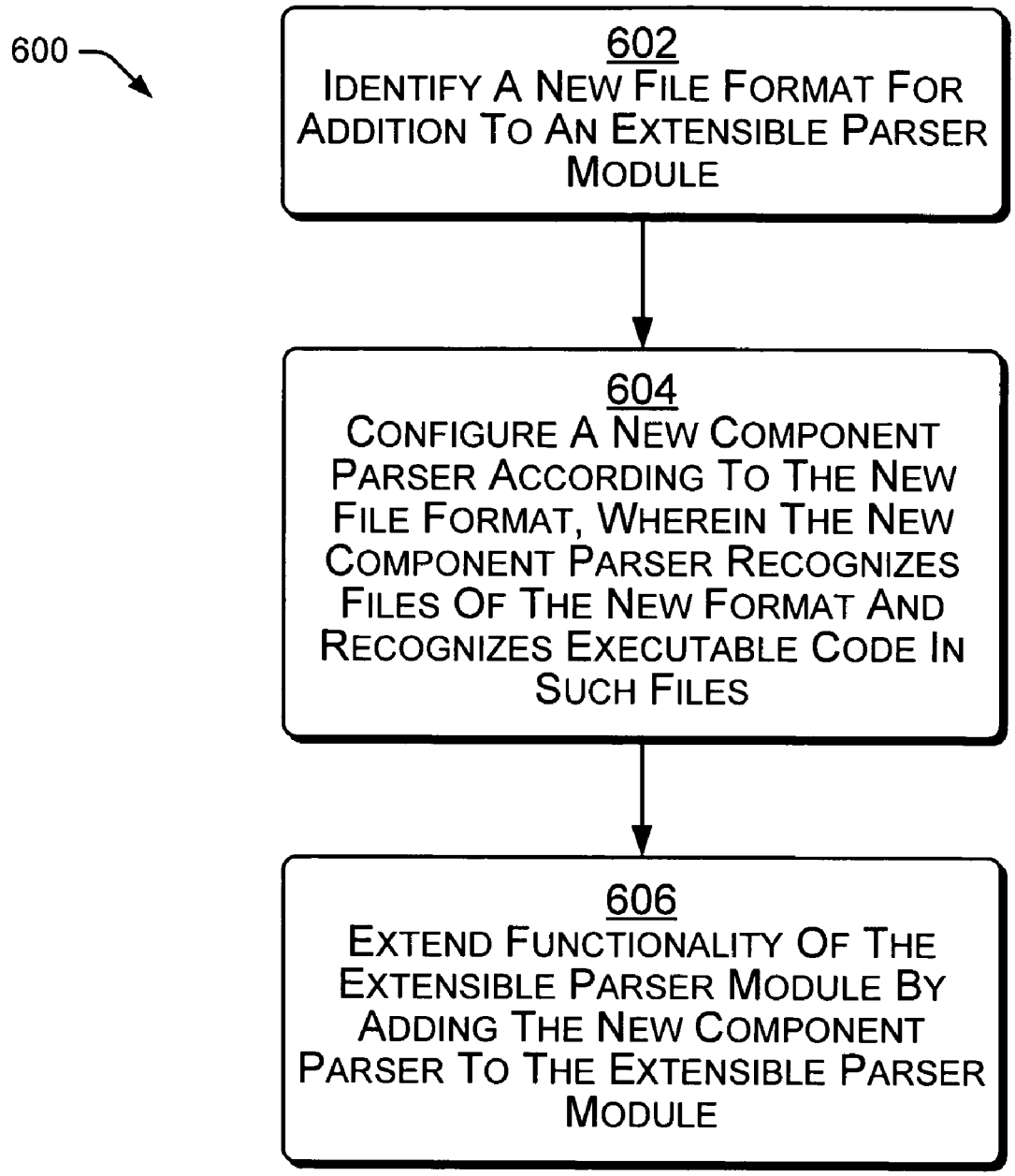
FIG. 6 is a flow diagram that describes an exemplary method by which the extensible parser module seen in FIG. 5 is extended.

FIG. 5 shows exemplary detail of the code detection module 206 seen in FIGS. 2-4. The exemplary code detection module 206 may be configured in software, firmware or hardware, such as by an ASIC (application specific integrated circuit). An extensible parser module 502 may be formulated as a table configured to include a plurality of component parser modules 506(1)-506(N). The extensible parser module may be extended, such as by an exemplary method 600 seen in FIG. 6. Extensibility is desirable, since it is frequently the case that new file formats become known, or that interest in known file formats is increased. Accordingly, the extensible parser module 502 may be expanded to include an additional component parser 506(N+1) configured to recognize an additional file format and also configured to check for executable code within the new file format. FIG. 6 shows an exemplary process 600 by which the extensible parser module 502 of the code detection module 206 may be extended. At block 602, a file format is identified for addition to the extensible parser module 502. For example, it may be desired that the extensible parser module 502 be extended for use with jpeg files. At block 604, a new component parser is configured according to the new file format (e.g. jpeg), wherein the new component parser is configured to recognize files of the new format and recognize executable code within such files. At block 606, functionality of the extensible parser module 502 is extended by addition of the new component parser 506(N+1) to an extensible table within the extensible parser 502.

Referring again to FIG. 5, the extensible parser module 502 is configured to contain a plurality of component parser modules 506(1)-506(N), wherein only two component parser modules are shown for reasons of illustrative simplicity. Each of the component parser modules 506(1)-506(N) is configured to recognize a file of a particular file format, and when the particular file format is recognized, is additionally configured to recognize executable code contained within the file. For example, parser module 506(1) may be configured to recognize a file format (e.g. a format by which data is organized for storage) of a Word® document. Parser module 506(1) may also be configured, upon recognition of the file format, to recognize executable code within an input file having a Word® file format. In this case, recognition of the file format assists in the recognition of the executable code.

Each of the component parser modules 506 includes a format investigation module 508, which is configured to parse the input file 204 and determine if the input file matches the file format for which the parser was configured to identify. The component parser modules also include a code section detector 510, which is configured to detect executable code within the input file particularly where that file is found to be of the file format associated with the component parser module.

Each component parser module 506 may also be configured to include three outputs, which indicate that the input file 204 has code 512, the input file has no code 514 and that it isn't known if the input file had code 516. In the implementation of FIG. 5, when the format investigation module 508 fails to detect a format associated with the input file 204, the component parser returns a don't-know status 516. When the file format was recognized, the output of the code detector 510 is used to determine if the input file has code 512 (i.e. code detector 510 found code) or the input file has no code 514 outputs is appropriate (i.e. code detector 510 did not find code).

The extensible parser module 502 also contains a controller or dispatch process 504, which is typically configured to: serve the input file to all available component parsers 506(1)-506(N); process the outputs of all of the component parsers; and send an overall response (i.e. code/no-code/don't-know) to an appropriate application. The controller 504 is configured to include a compound code section detector 518, which is configured to receive input from each component parser 506(1)-506(N) and to determine if any of the component parsers found code. Where code was detected by one of the component parsers 506(1)-506(N), output of the code detection module 206 will be the file-has-code status 208. A compound format investigation module 520 is configured to determine whether any of the component parsers 506(1)-506(N) recognized a format of the input file 204. Such an investigation is typically appropriate where none of the component parsers 506(1)-506(N) detected executable code. Where a file format was detected by one of the component parsers 506(1)-506(N), output of the code detection module 206 will be the file-has-no-code status 210. Where a file format was not identified, don't-know (if the file has code) output of the code detection module 206 will be the don't-know status 212.

Exemplary Method

An exemplary method 700 for implementing aspects of the detection of code-free files will now be described with primary reference to the flow diagram of FIG. 7. The method applies generally to the operation of exemplary components discussed above with respect to FIGS. 2-4, and particularly FIG. 5. The elements of the described method may be performed by any appropriate means including, for example, hardware logic blocks on an ASIC or by the execution of processor-readable instructions defined on a processor-readable medium.

A "processor-readable medium," as used herein, can be any means that can contain, store, communicate, propagate, or transport instructions for use by, or execution by, a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection having one or more wires, a portable computer diskette, a random access memory (RAM), a read-only memory (ROM), an erasable programmable-read-only memory (EPROM or Flash memory), an optical fiber, a rewritable compact disc (CD-RW), and a portable compact disc read-only memory (CDROM).

Figure 7:
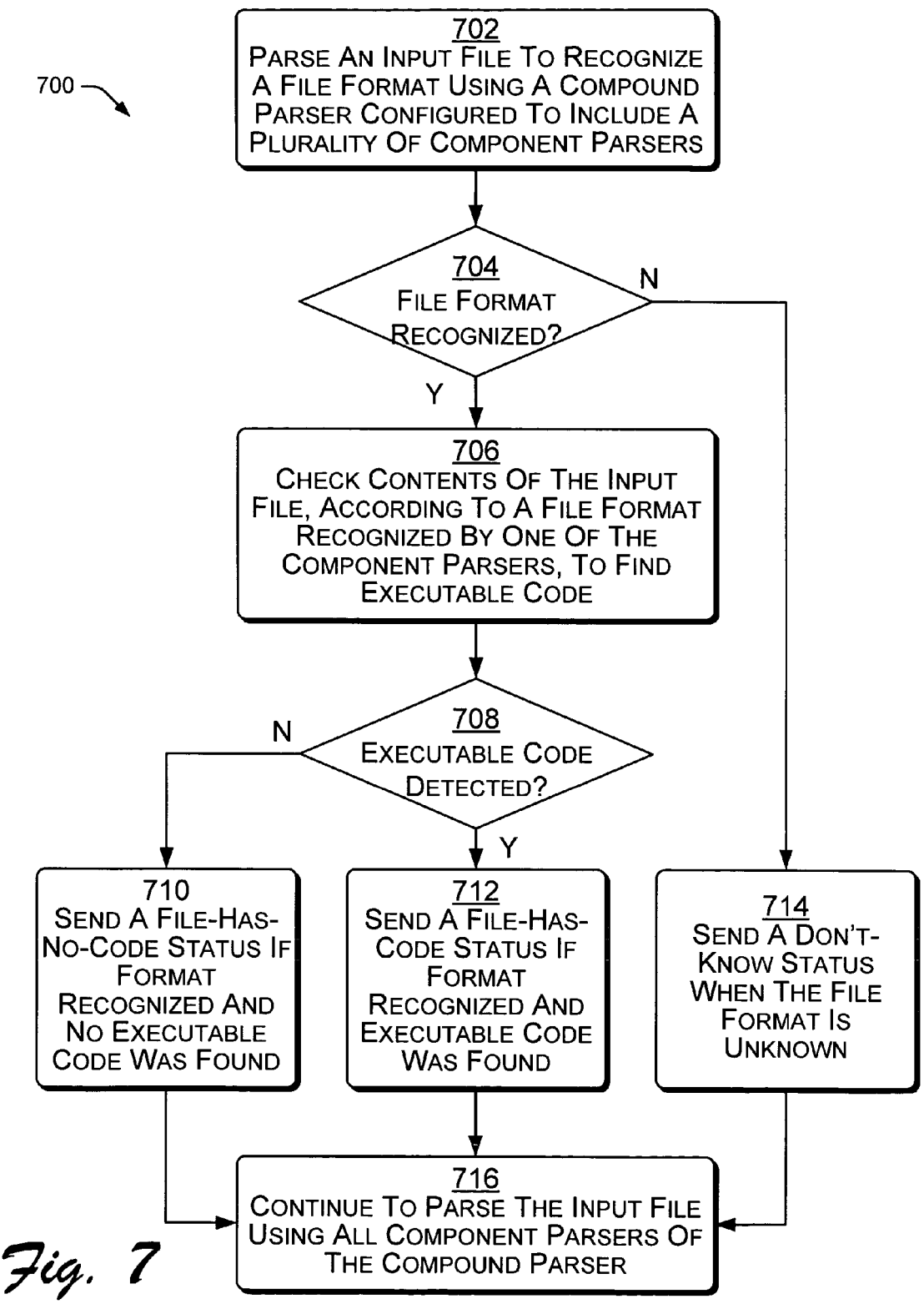
FIG. 7 is a flow diagram that describes an exemplary method to detect code free files.

FIG. 7 shows an exemplary method 700 for detecting executable code within files. At block 702, an input file is parsed to enable recognition of a file format by which the input file is configured. The parser may be configured in a compound manner, such as the compound or extensible parser 502 of FIG. 5, wherein the compound parser includes a plurality of component parsers 506(1)-506(N), each configured to recognize a specific file format.

At block 704, a determination is made if a file format has been recognized. If a file format has been recognized (following the Yes branch of block 704 to block 706), then at block 706 contents of the input file are checked according to the recognized file format to find executable code within the input file. Note that where the parser 502 is extensible and/or compound, the file format may match a file format for which one of the component parsers 506(1)-506(N) is configured to recognize. Accordingly, the controller 504 (FIG. 5) will evaluate information from each component parser 506(1)-506(N), when determining if a file format is recognized.

At block 708, a determination is made if executable code was found. If executable code was found (following the Yes branch of block 708 to block 712), then at block 712, a file-has-code status is sent, i.e. a file-has-code status is sent when the file format of the input file was recognized and executable code was found. The recognition may be made by any of the component parsers 506(1)-506(N). As seen by review of the structure of the exemplary code detection module 206 seen in FIG. 5, where the file format is recognized, a component parser is able to detect executable code, if present. Such code is inconsistent with file format, or is located according to the convention of the file format, and is therefore easily spotted. Accordingly, where one of the component parsers recognizes executable code, the controller responds by providing a file-has-code signal or message as appropriate.

At block 708, if a determination is made that indicates that no executable code was found (following the No branch of block 708 to block 710), then at block 710 a file-has-no-code status is sent when the file format of the input file was recognized and no executable code was found. Referring particularly to FIG. 5, it can be seen that if none of the component parsers recognized executable code within the input file, and the file format has been recognized by at least one of the component parsers, then the file-has-no-code status is registered. Note that a finding that the input file has been found to have no executable code is typically advantageous, since the absence of executable code assures the absence of malicious executable code, such as a virus.

Returning to block 704, if a file format has not been recognized (following the No branch of block 704 to block 714), then at block 714 a don't-know (if the input file has executable code) status 212 is sent when the file format is unknown. As seen by reference to block 212 of FIG. 5, where each of the component parsers was unable to determine the format of the file, the controller 504 is configured to issue a don't-know status to the appropriate receiver, such as an email application 202 (FIG. 2), an instant messaging application 302 (FIG. 3), an Internet browsing program 402 (FIG. 4) etc.

At block 716, in some applications, the component parsers 506(1)-506(N) may continue to parse the input file 204 even after one of the component parsers recognizes the format of the input file. This provides added security, in that, under rare circumstances, more that one component parser may make a valid recognition of a file format (i.e., a file could in rare instances be consistent with two different file formats). Thus in the rare circumstances wherein a second component parser recognizes the format of the input file, if either of the component parsers recognizes executable code, the controller 504 can be configured to report that the input file-has-code. Alternatively, the compound parser can be configured to discontinue parsing when one of the component parsers recognizes the format of the input file. This tends to reduce time spent on the parsing operation.

As seen above, the file-has-no-code, file-has-code or don't-know status may be sent to email, instant messaging, Internet browsing and other applications wherein security from virus-infected software is advantageous. FIGS. 2-4 illustrate exemplary uses for the code detection module 206. However, other uses for the code detection module are possible, such as in file storage applications wherein it is desired to store only executable code free files, etc.

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Computer

Figure 8:
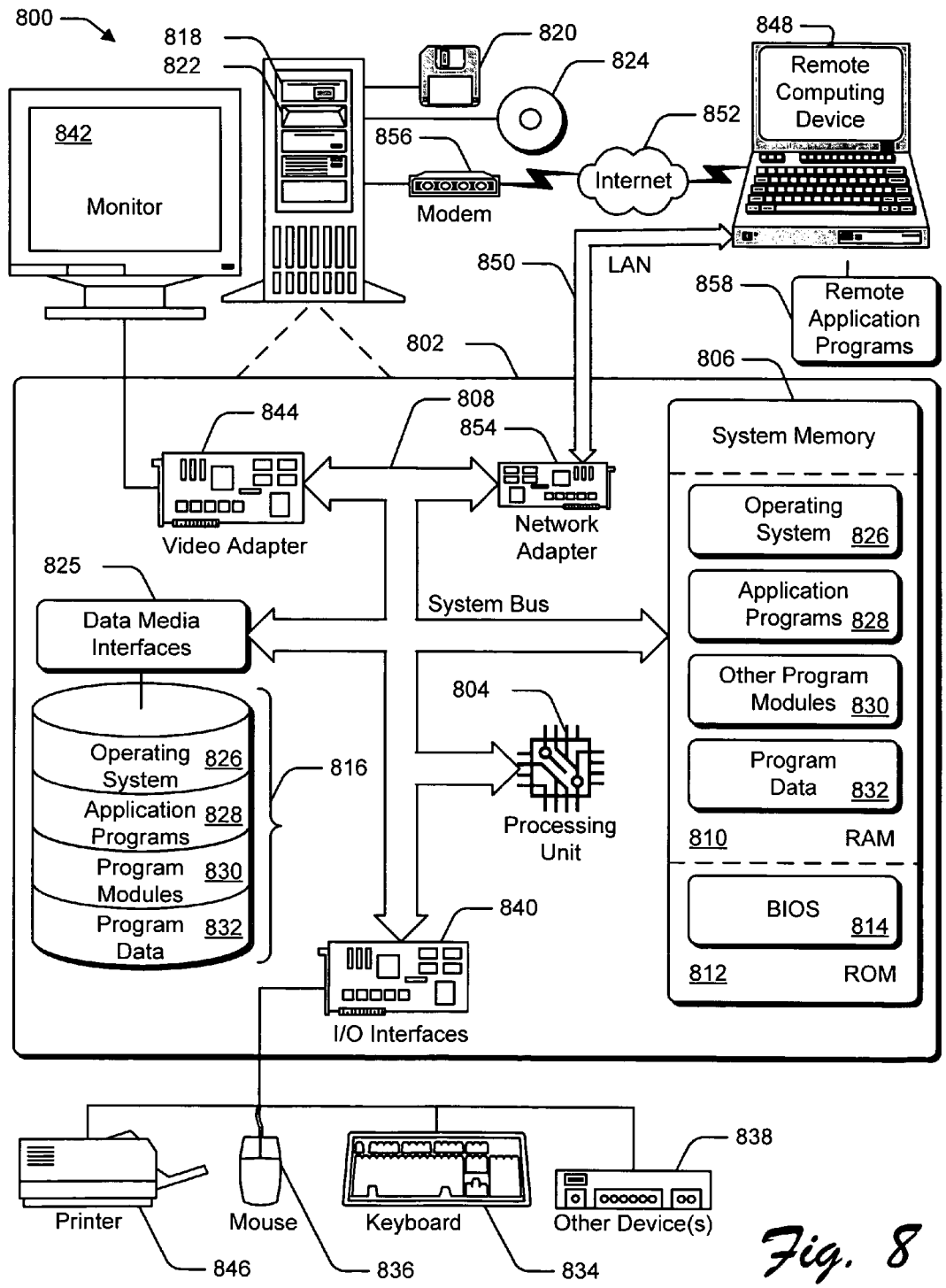
FIG. 8 is an exemplary computer system wherein a code detection module may be implemented.

FIG. 8 is an exemplary computer system wherein the exemplary code detection module and methods of operation of FIGS. 1-7 may be implemented. Although one specific configuration is shown, the code detection module may be implemented in other computing configurations. The computing environment 800 includes a general-purpose computing system in the form of a computer 802. The components of computer 802 can include, but are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. An example of a system bus 808 would be a Peripheral Component Interconnects (PCI) bus, also known as a Mezzanine bus.

Computer 802 typically includes a variety of computer readable media. Such media can be any available media that is accessible by computer 802 and includes both volatile and non-volatile media, removable and non-removable media. The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 can also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 825. Alternatively, the hard disk drive 816, magnetic disk drive 818, and optical disk drive 822 can be connected to the system bus 808 by a SCSI interface (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 826, one or more application programs 828, other program modules 830, and program data 832. Note that the code detection module 206 may be configured as an application program 828, a program module 830 or as a module located in another convenient location. Additionally, the input file 204 may be included among the data 832 or may be included in another convenient location. Each of such operating system 826, one or more application programs 828, other program modules 830, and program data 832 (or some combination thereof) may include an embodiment of a caching scheme for user network access information.

Computer 802 can include a variety of computer/processor readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 846 which can be connected to computer 802 via the input/output interfaces 840.

Computer 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computer system 802.

Logical connections between computer 802 and the remote computer 848 are depicted as a local area network (LAN) 850 and a general wide area network (WAN) 852. Such networking environments are commonplace in offices, enterprise-wide computer networks, intranets, and the Internet. When implemented in a LAN networking environment, the computer 802 is connected to a local network 850 via a network interface or adapter 854. When implemented in a WAN networking environment, the computer 802 typically includes a modem 856 or other means for establishing communications over the wide network 852. The modem 856, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs 858 reside on a memory device of remote computer 848. For purposes of illustration, application programs and other executable program components, such as the operating system, are illustrated herein as discrete blocks, although it is recognized that such programs and components reside at various times in different storage components of the computer system 802, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A processor-readable medium comprising processor-executable instructions for:

parsing an input file to recognize a file format of the input file, wherein the parsing repeatedly parses once with each of a plurality of component parsers contained within a compound parser, wherein each of the plurality of component parsers is configured for recognition of a specific file format by which an input file is configured, wherein the compound parser is extensible, and wherein extending the compound parser comprises adding an additional component parser configured to recognize an additional file format and executable code if present in a file of the additional file format;

checking contents of the input file, according to the recognized file format, to determine whether executable code exists within the input file, wherein the executable code determined to exist comprises both executable statements currently known, and not currently known, to be malicious code, and wherein the checking comprises detecting executable code because its location within the input file is inconsistent with the recognized file format;

continuing to parse the input file until a component parser recognizes the file format of the input file or until all available component parsers within the compound parser have parsed the input file; and sending a status in response to results of said checking, wherein sending a status comprises further instructions for:

sending a file-has-no-code status when the file format of the input file was recognized and no executable code was found;

sending a file-has-code status when executable code was found; and sending a don't-know status when the file format of the input file was not recognized;

wherein adding an additional component parser comprises instructions for:

identifying a new file format, wherein ability to recognize the new file format is functionality to be extended to the compound parser;

configuring a new component parser according to the new file format, wherein the new component parser is configured to recognize files of the new format and also to recognize executable code in files of the new format by locating executable code that is inconsistent with the new file format; and extending functionality of the compound parser by adding the new component parser to the compound parser.

2. The processor-readable medium as recited in claim 1, wherein sending the status comprises further instructions for sending the status to an email program.

3. The processor-readable medium as recited in claim 1, wherein sending the status comprises further instructions for sending the status to an instant messaging program.

4. The processor-readable medium as recited in claim 1, wherein sending the status comprises further instructions for sending the status to an internet browsing program.

5. The processor-readable medium as recited in claim 1, additionally comprising further instructions for continuing to parse the input file with all remaining component parsers after at least one component parser recognizes the file format of the input file.

6. A method of detecting code-free files, comprising:

identifying a new file format, wherein ability to recognize the new file format is functionality to be extended to a compound parser;

configuring a new component parser according to the new file format, wherein the new component parser is configured to recognize files of the new format and also to recognize executable code in files of the new format by locating executable code that is inconsistent with the new file format; and extending functionality of the compound parser by adding the new component parser to the compound parser;

wherein the compound parser, having extended functionality, is configured to operate to parse an input file by:

parsing the input file with the compound parser, wherein the compound parser is configured to include a plurality of component parsers, wherein each component parser is configured to recognize a specific data file format;

analyzing contents of the input file according to the recognized specific file format, where, wherein the executable code determined to exist comprises both executable statements currently known, and not currently known, to be malicious code; and sending a status in response to results of said analyzing, wherein sending the status comprises:

sending a file-has-no-code status when the file format of the input file was recognized and no executable code was found;

sending a file-has-code status when executable code was found; and sending a don't-know status when a file format of the input file was not recognized.

7. The method as recited in claim 6, additionally comprising sending the status to an email program.

8. The method as recited in claim 6, additionally comprising sending the status to an instant messaging program.

9. The method as recited in claim 6, additionally comprising sending the status to an internet browsing program.

10. The method as recited in claim 6, wherein parsing the input file comprises parsing the input file with each of the plurality of component parsers within the compound parser.

11. An apparatus for detecting code-free files, comprising:

a compound parser configured to repeatedly parse an input file, wherein each component parser within the compound parser is configured to recognize executable code within a specific file format selected from among a group of data file formats, and wherein the compound parser is extensible, and wherein extending the compound parser comprises adding an additional component parser configured to recognize an additional file format and executable code if present in a file of the additional file format; and a controller to examine success of each of the component parsers to recognize the specific file format for which it was configured to recognize and to find executable code within the input file, wherein the executable code recognized comprises both executable statements currently known, and not currently known, to be malicious code, and, wherein the controller is configured to send a status in response to results of said checking, wherein sending a status comprises:

sending a file-has-no-code status when the file format of the input file was recognized and no executable code was found;

sending a file-has-code status when executable code was found; and sending a don't-know status when the file format of the input file was not recognized.

12. The apparatus as recited in claim 11, wherein the apparatus for detecting code-free files is additionally configured to send the status to an email program.

13. The apparatus as recited in claim 11, wherein the apparatus for detecting code-free files is additionally configured to send the status to an instant messaging program.

14. The apparatus as recited in claim 11, wherein the apparatus for detecting code-free files is additionally configured to send the status to an internet browsing program.

15. The apparatus as recited in claim 11, additionally configured to send the status to:

a firewall;

a host intrusion detector; or a host vulnerability assessor.

16. The apparatus as recited in claim 11, additionally configured to send the status to a program selected from a group of programs, comprising:

a backup program;

a CD/DVD burning program; and a P2P file-sharing program.

17. The apparatus as recited in claim 11, wherein each of the component parsers is configured to recognize one of a plurality of data file formats.

18. The apparatus as recited in claim 11, wherein the compound parser is configured to allow extension by addition of a new component parser to the compound parser, wherein the new component parser recognizes a further file format and recognizes executable code within the further file format.

* * * * *